United States Patent [19]

Durand et al.

[11] Patent Number: 5,262,373
[45] Date of Patent: Nov. 16, 1993

[54] PROCESS FOR THE SYNTHESIS OF METAL OXIDES OF HIGH SPECIFIC SURFACE AREA AND HIGH POROSITY, OXIDES OBTAINED AND CATALYSTS CONTAINING THE SAID OXIDES

[75] Inventors: Bernard Durand, Meyzieu; Dominique de Mareuil, Lyon; Michel Vrinat, Calvire; Thierry des Gourieres, Lyon, all of France

[73] Assignee: Societe Nationale Elf Aquitaine, Courbevoie, France

[21] Appl. No.: 778,831

[22] PCT Filed: Apr. 18, 1991

[86] PCT No.: PCT/FR91/00322
 § 371 Date: Jan. 17, 1992
 § 102(e) Date: Jan. 17, 1992

[87] PCT Pub. No.: WO91/16265
 PCT Pub. Date: Oct. 31, 1991

[30] Foreign Application Priority Data
 Apr. 20, 1990 [FR] France .................. 90 05049

[51] Int. Cl.$^5$ .................. B01J 21/04; B01J 21/06; B01J 21/08; B01J 37/12

[52] U.S. Cl. .................. 502/255; 502/439; 502/527; 502/232; 502/242; 502/263; 502/308; 502/309; 502/350; 502/351; 502/349; 502/355; 502/314; 502/315; 423/600; 423/608; 423/579; 423/610; 423/335

[58] Field of Search .......... 502/439, 527, 232, 242, 502/255, 263, 308, 309, 315, 350, 351, 439, 355, 314; 423/600, 608, 579, 610, 335

[56] References Cited

U.S. PATENT DOCUMENTS

| | | | |
|---|---|---|---|
| 3,923,533 | 12/1975 | Hammel et al. | 502/439 X |
| 4,221,768 | 9/1980 | Inoue et al. | 502/242 X |
| 4,293,535 | 10/1981 | Arendt | 423/593 |
| 4,402,868 | 9/1983 | Duranleau et al. | 502/315 |
| 4,621,072 | 11/1986 | Arntz et al. | 502/308 X |
| 4,731,352 | 3/1988 | Sekido et al. | 502/439 |

FOREIGN PATENT DOCUMENTS 0395328 8/1973 U.S.S.R.

*Primary Examiner*—W. J. Shine
*Assistant Examiner*—Douglas J. McGinty
*Attorney, Agent, or Firm*—Burgess, Ryan & Wayne

[57] ABSTRACT

A process is provided for the synthesis for metal oxides of high specific surface area and high porosity which are particularly useful as catalyst supports. The process comprises forming a mixture of a salt of at least one metal and a molten salt medium comprising at least one alkali metal salt having an oxidizing effect, maintaining this mixture at the reaction temperature for the time necessary to convert the salt to oxide and thereafter isolating the metal oxide formed.

16 Claims, No Drawings

PROCESS FOR THE SYNTHESIS OF METAL OXIDES OF HIGH SPECIFIC SURFACE AREA AND HIGH POROSITY, OXIDES OBTAINED AND CATALYSTS CONTAINING THE SAID OXIDES

BACKGROUND OF THE INVENTION

1) Field of the Invention

This invention relates to the synthesis of metal oxides of high specific surface area and high porosity which are stable to heat.

2) Background Art

For use as an adsorbent and especially as a catalyst support, it is important to have available metal oxides of high specific surface area and high porosity which retain their specific surface area and their porosity during prolonged heating at elevated temperature. In fact, the lifetime of the catalysts in part depends on their resistance to heating, and the lifetime of the catalysts is a factor determining the economy of catalytic processes. The use of a stable catalyst support makes it possible to reduce to a minimum the plant shutdowns for replacement of spent catalyst.

The synthesis of these oxides by calcination of metal salts requires high temperatures. For some metals, such as zirconium, the calcination of its salts at high temperature results in the formation of oxides having a specific surface area which does not exceed 2-3 m$^2$/g.

Other oxides may be obtained by calcination, in general of the corresponding hydroxides. Thus, aluminas are obtained by heating various aluminium hydroxides.

The temperature stability of these oxides and therefore the lifetime of the catalysts which contains them is still far from being satisfactory (sic).

Numerous processes have been proposed for the production of highly porous catalyst supports, the porosity of which withstands prolonged heat treatments.

Thus, according to U.S. Pat. No. 4,731,352, metal oxides such as alumina, silica, zirconium oxide or titanium oxide are combined with an olefin/maleic anhydride copolymer. This combination produces a significant and stable porosity. However, the process is lengthy and costly to carry out and proceeds via the dissolution of a metal salt and the formation of a gel.

According to French Patent Application 2,540,887, a stable zirconium oxide is obtained by coprecipitation of a solution containing a zirconium compound and a stabilizing metal compound, followed by drying and calcination.

Russian Patent SU-A-395328 describes the preparation of porous zirconium by oxidation with alkali metal carbonates in a mixture of molten alkali metal chlorides. As the melting point of this mixture is very high, the crystallites obtained have a large size, of around 3000 nm, and thus a low specific surface area. It should also be mentioned that this patent gives no indication whatsoever with regard to the specific surface areas or the porosities of the solids obtained.

We have now found a process for simple synthesis, in a single step, of metal oxides of high specific surface area and high porosity. The temperatures used in this process are very much lower than the customary calcination temperatures, which makes the process more economical. The oxides of high specific surface area and high porosity which are obtained are stable at high temperature and permit excellent dispersion of the catalytically active phases.

SUMMARY OF THE INVENTION

The process for the synthesis of metal oxides of high specific surface area and high porosity, according to the invention, is characterised in that a mixture of any salt of at least one metal and a molten salt medium comprising at least one alkali metal salt having an oxidising effect is produced, this mixture is kept at the reaction temperature for the time necessary to convert the salt to oxide and the metal oxide formed is isolated.

This process permits the synthesis of a very large number of metal oxides. It is particularly useful for the synthesis of oxides of metals of groups 3 and 4 of the periodic classification of the elements and more particularly for the synthesis of refractory oxides, such as the zirconium, aluminium, silicon and titanium oxides.

The process also permits the preparation of mixed oxides or dispersion of oxides of these metals. The mixed oxides prepared by the process of the present invention have a homogeneous distribution of their elements.

Thus, it is possible to prepare mixed catalyst supports containing, for example, zirconium oxide and alumina.

Moreover, it is known that the crystallisation of zirconium oxide may be oriented by the introduction of divalent or trivalent metals, such as yttrium, magnesium or calcium, which have a stabilising effect on one crystalline form. The crystalline form of the zirconium oxide also depends on the amount of stabilising metal. Yttrium in low concentration promotes the formation of quadratic zirconium oxide, whereas in high concentrations cubic zirconium oxide is formed. The process according to the invention allows a homogeneous distribution of these stabilizing metals, giving increased efficiency.

DESCRIPTION OF THE PREFERRED EMBODIMENTS

The metal salt to be converted to oxide is any salt of this metal. In general it is an oxychloride or a nitrate, sulphate or halide, such as the chloride or bromide. In the case of zirconium, zirconium oxychloride, $ZrOCl_2$, is preferably used.

The molten salt medium comprises at least one alkali metal salt having an oxidizing effect. Alkali metal salts are used because they make it possible to work at low temperatures, necessary in order to produce oxides of high specific surface area and high porosity. The use of its (sic) water-soluble alkali metal salts also facilitates the recovery of the oxides formed.

Amongst the alkali metal salts having an oxidizing effect, such as the nitrates or sulphates, the nitrates are preferably used because of their lower melting point. The nitrates are reduced to nitrogen dioxide in the course of the reaction.

It is advantageous to use a eutectic mixture, such as a $KNO_3/NaNO_3$ mixture. This mixture melts at 225° C. and allows the reaction temperature to be selected within a very wide range.

The temperature has an influence on the specific surface area and the porosity of the oxide obtained.

A rise in the temperature promotes the formation of large pores, but has the converse effect on the specific surface area. The optimum must be determined depending on the final use of the oxide. In the case of use as catalyst support, the size of the pores must be compatible with the size of the molecules to be converted.

The reaction temperature therefore varies depending on the desired properties and also depending on the nature of the reactants.

If alkali metal nitrates are used, the reaction temperature in general varies between 250° and 550° C. In the case of the synthesis of zirconium oxide, the temperature is generally between 450° and 550° C.

The implementation of the process for synthesis of metal oxides will be described in more detail.

The metal salt or salts to be converted to oxides are introduced into a reactor. If they are in the form of hydrates, they are first dehydrated. The alkali metal salt or salts having an oxidizing effect are added to this medium and the whole is brought to the reaction temperature.

The alkali metal salts are used in large excess relative to the metal salt to be converted to oxide. In general, 2 to 3 times the amount of alkali metal salt is used with respect to the stoichiometry of the reaction.

The reaction is complete in 0.5 h to 2 hours. The reaction mixture is cooled and the alkali metal salts removed by washing with water. The metal oxides are recovered, in general by filtering off.

The oxide yields are close to 100%.

In the case of the synthesis of zirconium oxide, the zirconium is generally used in the form of the oxychloride. The zirconium oxide/alumina mixtures are obtained from a zirconium salt, such as zirconium oxychloride, and an aluminium salt, such as aluminium chloride. The zirconium oxide is generally stabilized by a divalent or trivalent metal, such as yttrium, magnesium or calcium. Yttrium is generally used in the form of the chloride $YCl_3$.

The crystalline form of the zirconium oxide will depend on the amount of stabilizing metal. Its porosity and its specific surface area will depend on the reaction temperature.

The metal oxides of high specific surface area and high porosity, which are obtained according to the invention, are used as adsorbents or catalyst supports for catalysts for the conversion of organic compounds.

If they are used as catalyst support, the active phases are generally introduced by impregnation with precursors of the active phases. These precursors are converted into catalytically active phases, in general by calcination and sulphuration.

The catalysts having a support comprising metal oxides prepared according to the invention have an improved thermal stability and an improved catalytic activity compared with commercial catalysts.

We have compared the change in the specific surface area of quadratic and cubic zirconium oxides obtained according to the invention with that of a conventional zirconium oxide, as described in the article by P. D. L. MERCERA et al. (Applied Catalysis 57 127-148 (1990)). The zirconium oxides prepared according to the invention have a substantially improved structural stability compared with the conventional zirconium oxide.

Used as catalyst supports, these oxides allow a very homogeneous distribution of the active phases, which improves their performance compared with that of commercial catalysts.

The catalysts based on zirconium oxide, or on zirconium oxide/alumina, prepared according to the invention are excellent catalysts for hydrotreatment reactions of hydrocarbon charges, such as hydrogenation, hydrodenitrification and hydrodesulphuration. The active phases in these catalysts generally contain nickel and molybdenum.

The following examples illustrate the invention without, however, restricting it.

EXAMPLE 1

Preparation of a Quadratic Zirconium Oxide

A commercial zirconium oxychloride $ZrOCl_2.8H_2O$ (MERCK) is added to yttrium chloride, $YCl_3.6H_2O$ (PROLABO) in an amount such that the molar ratio $Y_2O_3/ZrO_2$ is 0.03. The mixture is dehydrated by heating at 150° C. for 30 minutes. A $KNO_3/NaNO_3$ mixture is introduced in large excess relative to the stoichiometric amounts (approximately a ratio of 2).

The mixture is heated to 485° C. and this temperature is maintained for 1 hour. After cooling the bath and removing the alkali metal salts by prolonged washing with water, the zirconium oxide is recovered by filtering off. The yield is close to 100%.

The quadratic zirconium oxide obtained is characterized by a specific surface area, determined by the BET method, of 135 $m^2/g$, a pore volume for nitrogen of 0.29 $cm^3/g$ and an average pore radius of 3.5 nm. Observation under a transmission microscope shows crystallites which have a diameter of between 300 and 1000 nm.

This sample will be designated A below.

EXAMPLE 2

Preparation of a Cubic Zirconium Oxide

Example 1 is repeated, but using a $Y_2O_3/ZrO_2$ molar ratio of 0.1 and a reaction temperature of 520° C. The yield is close to 100%.

A cubic zirconium oxide is obtained which is characterized by a specific surface area, determined by the BET method, of 140 $m^2/g$, a pore volume for nitrogen of 0.20 $cm^3/g$ and an average pore radius of 3 nm. The diameter of the crystallites is between 350 and 1800 nm.

This sample will be designated B below.

EXAMPLE 3

Preparation of an Alumina/Zirconium Oxide Dispersion

The zirconium oxychloride and yttrium chloride are dehydrated as above. Anhydrous aluminium chloride $AlCl_3$ (PROLABO) and a $KNO_3/NaNO_3$, mixture are added. The $Al_2O_3/ZrO_2 + Y_2O_3$ molar ratio is 1 and the $Y_2O_3/ZrO_2$ molar ratio is 0.03. The nitrates are used in large excess relative to the stoichiometric amounts (approximately a ratio of 2).

The mixture is held at 450° C. for 1 hour. The recovery of the oxides formed proceeds in the same way as in Example 1. The yield is close to 100%. The alumina/zirconium oxide dispersion obtained is characterized by a specific surface area, determined by the BET method, of 200 $m^2/g$, a pore volume for nitrogen of 0.26 $cm^3/g$ and a pore radius of 3 nm.

EXAMPLE 4

Preparation of Silica

A commercial silicon chloride, $SiCl_4$ (MERCK), is added to a $KNO_3/NaNO_3$ mixture in amounts such that the nitrates are in large excess relative to the stoichiometric amounts (approximately a ratio of 2).

The mixture is held at 450° for 1 hour. The recovery of the oxide proceeds in the same way as in Example 1. The yield is close to 100%.

The silica obtained is characterized by a specific surface area, determined by the BET method, of 750 m$^2$/g and a pore volume for nitrogen of 0.40 cm$^3$/g.

EXAMPLE 5

Preparation of Titanium Oxide

A commercial titanium chloride, TiCl$_4$ (MERCK), is added to a KNO$_3$/NaNO$_3$ mixture in amounts such that the nitrates are in large excess relative to the stoichiometric amounts (approximately a ratio of 2).

The mixture is held at 420° C. for 1 hour. The recovery of the oxide formed proceeds in the same way as in Example 1. The yield is close to 100 %

The titanium oxide obtained is characterized by a specific surface area, determined by the BET method, of 150 m$^2$/g, a pore volume for nitrogen of 0.25 cm$^3$/g and an average pore radius of 3 nm.

EXAMPLE 6

Stability

Samples A and B were compared with a conventional zirconium oxide as described in the article by P. D. L. MERCERA et al. (Appl. Catal, 57 (1990) 127-148).

The modification of the specific surface area of the various samples following calcination at various temperatures was evaluated by dividing the specific surface area obtained at high temperature by that determined for the non-calcined sample following recovery.

TABLE I

| T °C. | 450 | 550 | 650 |
|---|---|---|---|
| A | 0.9 | 0.7 | 0.7 |
| B | 1.0 | 0.9 | 0.9 |
| ZrO$_2$ Convent. | 0.4 | 0.3 | 0.2 |

Samples A and B have a substantially improved structural stability compared with a conventional zirconium oxide.

EXAMPLE 7

Preparation of Catalysts Containing an Active NiMo Phase

The catalysts are obtained by co-impregnation without excess of a solution of the solids prepared by the method explained in Examples 1 to 5 with solutions of ammonium heptamolybdenate and nickel nitrate, in amounts such that the Mo content is 2.8 atoms/nm$^2$ and the Ni content corresponds to a (Ni/Ni+Mo) molar ratio of 0.3 or 0.4. The resulting products are then calcined in air at 350° C. for 2 hours.

The catalysts prepared in this way from solids A and C will be termed AA and CC.

EXAMPLE 8

Use in a Catalytic Test on a Model Molecule: Hydrogenation of Biphenyl

The reaction is carried out in the gas phase in a dynamic microreactor under pressure.

The catalysts are presulphurised in the presence of a H$_2$/H$_2$S(15%) mixture for 4 hours at 400° C.

Hydrogen, the gas reactant, is saturated with biphenyl in a saturator/condenser operating under the same pressure as the reactor. A system of capillaries ensures the stabilization of the pressure and the letdown to atmospheric pressure. The analysis is carried out in a flame ionisation chromatograph. The determinations of the degree of conversion of biphenyl enable the specific rates (per gram) of the catalysts, A$_s$, to be calculated, applying the equation:

$$A_s = Q_{BP} \times \text{degree of conversion}/m$$

where $Q_{BP}$=flow rate of biphenyl and m=mass of catalyst.

The operating conditions are as follows:

| | |
|---|---|
| $P_{total}$ = 23 10$^5$ Pa | $m_{cata}$ = 100 mg |
| $P_{BP}$ = 5.8 10$^2$ Pa | $Q_{BP}$ = 7 10$^{-8}$ mol/s |
| $P_{H2S}$ = 3.5 10$^2$ Pa | $Q_{H2}$ = 2 10$^{-4}$ mol/s |

The following table gives the specific activities of the catalysts AA and CC at 530K compared with the activity of the commercial Ni/Mo-on-alumina catalyst (HR 346 from Procatalyse).

TABLE 2

| Catalyst | A$_s$ (mol/s · g) |
|---|---|
| AA | 14.5 10$^{-8}$ |
| CC | 13 10$^{-8}$ |
| HR 346 | 12 10$^{-8}$ |

EXAMPLE 9

Use in a Catalytic Test on a Model Molecule: Hydrodenitrification (HDN) of 2,6-Diethylaniline An accumulation of alkylanilines in the effluents has been found during the hydrotreatment of heavy or middle cuts of products from the distillation of crude. This accumulation has been attributed to the inhibition of the HDN of the alkylanilines formed during the first C-N cut by the polycyclic compounds initially present in the charge. The test used simulates this phenomenon using model molecules, on a micropilot scale. The inhibition of the NDN of 2,6-diethylaniline by variable amounts of quinoline is studied in this way.

The reaction is carried out in the gas phase, in a dynamic microreactor operating under pressure.

The catalyst is sulphurized in situ by the n-heptane/dimethyl disulphide solvent mixture from 200° C.

The entire installation, under high hydrogen pressure, is thermally insulated. The feed is at a constant flow rate and under a pressure fixed by the total pressure of the reaction. The reagent charges (solvent+DEA+quinoline) and the sulphurizing mixture feed 2 GILSON metering pumps allowing operation at variable flow rate. The reaction products in gas form are let down to atmospheric pressure by the bias of a pneumatically controlled control valve. The analyses are carried out on-line by a flame ionisation chromatograph.

The operating conditions are as follows:

| | |
|---|---|
| $P_{total}$ = 60 10$^5$ Pa | $P_{heptane}$ = 6 10$^4$ Pa |
| | $PH_2$ = 57 10$^5$Pa |
| $P_{quinoline}$ = $P_{DEA}$ = 4 10$^3$ Pa | |
| $P_{H2S}$ = 1.2 10$^5$ Pa | |
| $m_{catalyst}$ = 500 mg | |
| $Q_{H2}$ = 100 l/h | |
| $Q_{DEA}$ = $Q_{quinoline}$ = 12 cm$^3$/h | |

The inhibitory power of quinoline can then be determined by comparing the conversion to diethylamine (DEA) as a function of the amount of quinoline added:

TABLE 3

| | Catalyst | | |
|---|---|---|---|
| | Quino/DEA | AA | HR 346 |
| Conversion | 0 | 95 | 88 |
| to DEA | 0.1 | 72 | 33 |
| (%) | 0.3 | 46 | 12 |

The catalyst according to the invention is more resistant to the inhibiting effect of quinoline than the commercial catalyst.

We claim:

1. Process for the synthesis of metal oxide of high specific surface area and high porosity which comprises forming a mixture of a salt of at least one metal and a molten salt medium comprising at least one alkali metal salt having an oxidizing effect and selected from the group consisting of alkali metal nitrates and sulfates, maintaining said mixture at a reaction temperature and time to convert the salt of at least one metal to a metal oxide, and isolating the metal oxide formed.

2. Process according to claim 1, wherein the alkali metal salt having an oxidizing effect is an alkali metal nitrate.

3. Process according to claim 1, wherein the molten salt medium comprises a eutectic mixture of two alkali metal salts.

4. Process according to claim 3, wherein the eutectic mixture is a mixture of sodium nitrate and potassium nitrate.

5. Process according to claim 1, wherein the reaction temperature varies between 250° and 550° C.

6. Process according to claim 1, wherein the reaction time is between 30 minutes and 2 hours.

7. Process according to claim 1, wherein the alkali metal salt having an oxidizing effect is used in large stoichiometric excess with respect to the metal salt.

8. Process according to claim 1, wherein the metal oxide formed is isolated by filtering off following removal of the oxidizing alkali metal salts by washing with water.

9. Process according to claim 1, wherein the metal oxide is an oxide of at least one metal of groups 3 and 4 of the periodic classification of the elements.

10. Process according to claim 9, wherein the metal oxide is at least one refractory oxide, from the group consisting of zirconium oxide, aluminium oxide, silicon oxide and titanium oxide.

11. Process according to claim 10, wherein the metal oxide is zirconium oxide or a zirconium oxide/alumina mixture.

12. At least one metal oxide of high specific surface area and high porosity selected from the group consisting of zirconium oxide, alumina, silica, titanium oxide, and mixtures thereof, obtained by a process which comprises forming a mixture of a salt of at least one metal and a molten salt medium comprising at least one alkali metal salt having an oxidizing effect and selected from the group consisting of alkali metal nitrates and sulfates, maintaining said mixture at a reaction temperature and time to convert the salt of at least one metal to a metal oxide, and isolating the metal oxide formed.

13. Process according to claim 1, wherein the alkali metal salt having an oxidizing effect is used in a stoichiometric excess of 2 to 3 with respect to the metal salt.

14. A catalyst for the conversion of organic compounds comprising support which contains at least one metal oxide according to claim 12.

15. A catalyst according to claim 14 wherein said at least one metal oxide is zirconium oxide or zirconium oxide/alumina.

16. A catalyst according to claim 14 further comprising an active phase containing a nickel molybdenum.

* * * * *